Figure 1:
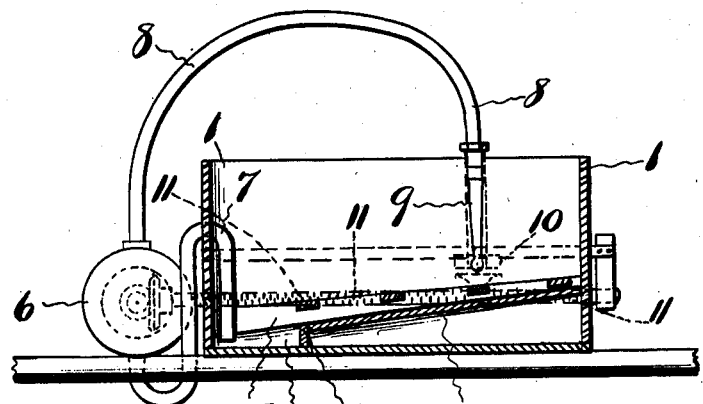

G. E. DUNTON.
METHOD FOR TREATING MOLDS USED IN THE ART OF ELECTROTYPING.
APPLICATION FILED OCT. 24, 1913.

1,111,444.

Patented Sept. 22, 1914.

Witnesses

Inventor
George E. Dunton
by Blackwood Bros
Attorneys

UNITED STATES PATENT OFFICE.

GEORGE E. DUNTON, OF NEW YORK, N. Y.

METHOD FOR TREATING MOLDS USED IN THE ART OF ELECTROTYPING.

1,111,444.   Specification of Letters Patent.   Patented Sept. 22, 1914.

Application filed October 24, 1913. Serial No. 796,991.

*To all whom it may concern:*

Be it known that I, GEORGE E. DUNTON, residing at New York, in the county of New York and State of New York, a citizen of the United States, have invented a certain new and useful Method for Treating Molds Used in the Art of Electrotyping; and I do hereby declare the following to be a full, clear, and exact description of the invention, such as will enable others skilled in the art to which it pertains to make and use the same.

My invention relates to an improved method for treating molds used in the art of electrotyping and more particularly to the wax molds used in the forming of electrotype plates.

The invention has for its object to provide a method for treating molds whereby the adhesion between the mold and the grease, oil or oily substance expressed therefrom, by the pressing of the form or cut into the mold, in making the impression preparatory to the deposition of the printing shell is broken.

The invention has for a further object to provide a method for treating molds whereby the adhesion between the grease, oil or oily substance, expressed therefrom, is broken and the grease, oil or oily substance removed prior to the application of the conductive coating.

The invention further has for its object to provide a method for treating molds whereby the adhesion between the mold and the grease, oil or oily substance expressed therefrom, by the pressing of the form or cut into the mold, in making the impression therein is broken without affecting the material of which the mold is composed. The material of which the molds are formed for the production of printing plates or surfaces in the electrotyping art is generally bees-wax, ozocerite wax or like substance which contains an appreciable percentage of grease, oil or oily substance in its composition. In bees-wax the grease is due to the presence of palmitin and in ozocerite wax, mineral wax, it is due to the presence of petroleum.

In the producing of printing plates or other printing surfaces, to form perfect reproductions of the originals from which the molds are made, in the art of electrotyping it is of the utmost importance that the molds be treated to eliminate or free them from all grease, oil or oily substances, prior to the application of the conductive coating, as any treatment for the removal of the grease, oil or oily substances to which the mold may be subjected subsequent to the application of the conductive coating will result in the contamination, deterioration and destruction of the conductive coating.

When making an impression in a wax or other similar mold, preparatory to the deposition of the printing shell, the desired form or cut is pressed or forced into the surface of the mold, which causes any grease, oil or oily substance contained therein to be expressed or forced out and form a thin coating or film on the face of the mold and said coating or film is exceedingly troublesome to the electrotyper, as it causes imperfect and faulty reproductions, especially in the case where the so-called half tone illustrations are being made, which are composed of a collection of very fine, minute dots, or in the duplicating of color plates where three or four, or even more, printings are necessary the least variation from the original plate, such as the filling up of the minute identations made by each dot in the wax mold would result in a thickening of the duplicate or reproduction and instead of having a well defined flat printing surface the points would be rounded and lacking in height from one half to one fourth of the original which would ruin the plate.

Extensive experiments have demonstrated to me that when the form or cut is pressed into the mold, preparatory to the deposition of the printing shell, it will cause the grease, oil or oily substance therein to be expressed and that when the conductive coating is applied it will become impregnated with the grease, oil or oily substance and that the adhesion of the said conductive coating to the face of the mold will be greatly impaired.

Figure 2:
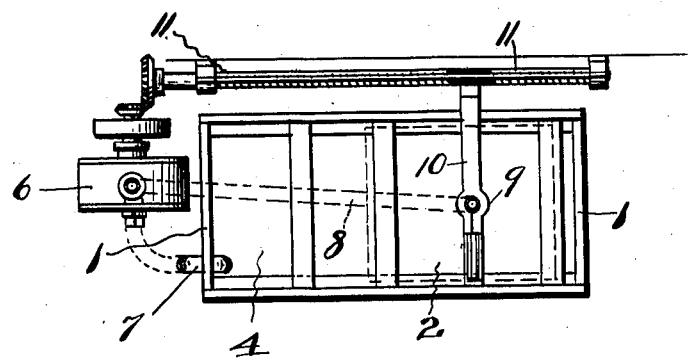
Figure 3:
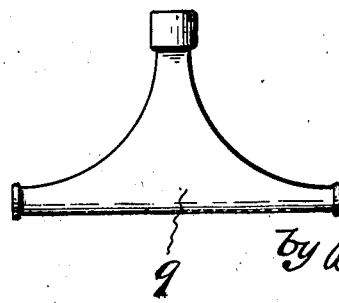

Referring to the drawings which illustrate one form of apparatus for practising or carrying out my method, Figure 1 is a longitudinal vertical sectional view. Fig. 2 a top plan view. Fig. 3 a detail sectional view of the sprinkler.

In the drawings, in which like reference characters denote like parts throughout the several views, 1 represents a tank having an inclined false bottom 2 which terminates at a point 3 short of one end of the tank and forms a well 4. The false bottom 2 is adapted to receive a removable frame 5 upon which the mold to be treated is placed and 6 is a pump, of any desired pattern, which is connected by means of a siphon suction pipe 7 to the well 4 and is provided with a flexible discharge pipe or hose 8 which connects with a sprinkler head 9 extending downwardly into the tank, and directly over the mold, and is carried or mounted on a slidable frame 10 which travels on traverse screw 11 operated by any suitable means and said sprinkler head sprays the entire mold. The sprinkler head is made preferably of a width to correspond with the width of the mold.

The operation of the apparatus is as follows, the pump and traverse screw are started and the mixture in the tank, hereafter mentioned, is drawn up, by the pump 6, and distributed regularly and evenly by the sprinkler head onto the mold and the adhesion of the grease, oil or oily substance thereon, which has been previously expressed by the pressure of a form or cut, is broken and the grease, oil or oily substance removed from the said mold.

In practising or carrying out my method of treating molds used in the art of electrotyping I form a mold in the usual manner, by pouring melted molding composition composed largely of ozocerite wax over thin sheets of metal placed on a suitable table and allow the same to become firm, set or hard by the cooling of the melted wax, then slice a thin layer or shaving from the surface of the wax to provide an even, smooth surface for the mold throughout the impression area. The form or cut is prepared in the usual manner by being planed down to insure an even surface, then washed with some detergent to remove any printing ink or other substance which may have adhered to the surface of the form or in the indentures therein, all excess of fluid is absorbed or removed and the form dried by being briskly rubbed with a moderately stiff brush, after which it is brushed over very lightly with a mixture of graphite or lamp black, as is also the surface of the wax, this graphite prevents the form from sticking in the wax, all the surplus material is shaken out of the form and any that then remains is carefully removed with a soft brush. The form thus prepared is placed on a slidable bed of a molding press and the mold placed carefully over its surface with the smooth powdered wax surface resting on the form, both are moved by the slidable bed into the molding press, pressure is applied which presses or forces the form into the wax to the predetermined depth desired by the operator of the press, the pressure is released, the slidable bed withdrawn from the press and the mold carefully detached from the form and removed to the builder's bench where it is carefully examined and if it passes inspection it is trimmed down by passing a knife over the surface to remove any portions of wax which may project beyond the surface of the mold as well as the surplus wax around the edges of the impression. Any portions which it is desired to make deeper in the plate are built up in the usual well known manner. At this stage or point I treat the mold to remove the grease, oil or oily substance which has been expressed or forced out from the body of the wax mold during the operation of molding, by washing the mold in a bath, the temperature of which is maintained at 100 degrees Fahrenheit, with a solution of soap dissolved in water to the consistency of strong suds, one pound of soap to four gallons of water, to which is added a small per cent. of carbonate of soda, one ounce to four gallons of the above.

The washing is carried out by placing the mold face up in a tank having a grating placed above the bottom on which the mold rests, the solution in the tank covering the mold to a depth of two or three inches, a force pump having a connecting hose or pipe connecting with the tank is provided with a sprinkler which discharges the liquid drawn from the tank onto the surface and indentures of the mold and breaks the adhesion between the grease expressed from the mold and the mold, and the grease is removed, the mold is then rinsed thoroughly in running water and suspended in a pickle liquid composed of water, ten gallons, sulfuric acid two quarts, hydrochloric acid one pint, to neutralize the alkali left on the surface or in the indentures of the mold and oxidize whatever diluted grease, oil or oily substance which may have remained in the indentures or on the surface of the mold. The mold is again rinsed thoroughly with water to remove all traces of the pickle together with any oxidized grease, oil or oily substance remaining, leaving the exposed surface of the wax clean and free from any contamination, after this rinsing the surface of the wax is dried by either allowing the mold to stand or by subjecting it to a blast of warm air from any suitable source after which the mold is ready to receive the conductive substance in the usual manner and then finished for use by the steps now well known in the art of electrotyping and which do not pertain to my invention.

What I claim is:—

1. The method of treating molds used in the art of electrotyping to break the adhesion of the grease thereto, prior to the application of the conductive coating, consisting in applying to the mold, under pressure, a substance which will break the adhesion between the mold and the grease and facilitate the removal of the grease, removing the grease by the force of pressure of said substance, subjecting the mold to the action of a neutralizing substance and then rinsing the mold and drying the same.

2. The method of treating molds used in the art of electrotyping to break the adhesion between the mold surface, the interstices or indentures therein and the grease, prior to the application of the conductive coating, consisting in treating the grease impregnated surface of the mold and its interstices or indentations with a substance which will break the adhesion between the mold and grease and facilitate the removal of the grease, removing the grease, treating the mold with a substance which will neutralize the substance used to break the adhesion and finally removing the neutralized substance.

3. The method of treating molds used in the art of electrotyping to break the adhesion between the mold and grease and facilitate the removal of the grease, consisting in subjecting the grease impregnated surface of the mold to the action of a substance which will break the adhesion between the mold and the grease and removing the grease, prior to the application of the conductive coating to the mold.

4. The method of treating molds used in the art of electrotyping to break the adhesion between the mold and the grease and remove the grease, consisting in taking the mold after it has been subjected to pressure and the grease expressed therefrom and breaking up the adhesion between the mold and the grease by treating the mold with an alkaline substance, then dipping the mold in a pickle to neutralize the alkaline substance and finally rinsing away the residue together with the liberated grease prior to the application of the conducting substance.

5. The method of treating molds used in the art of electrotyping to break the adhesion between the mold and the grease and remove the grease, consisting in spraying the mold with an alkaline soap solution to break the adhesion between the mold and the grease, treating with sulfuric hydrochloric acid pickle to neutralize the alkaline soap solution and remove the grease and rinsing the mold with water prior to the application of the conducting coating.

In testimony whereof I affix my signature in presence of two witnesses.

GEORGE E. DUNTON.

Witnesses:
H. W. BECKER,
N. F. FAIRCHILD.